Patented June 27, 1950

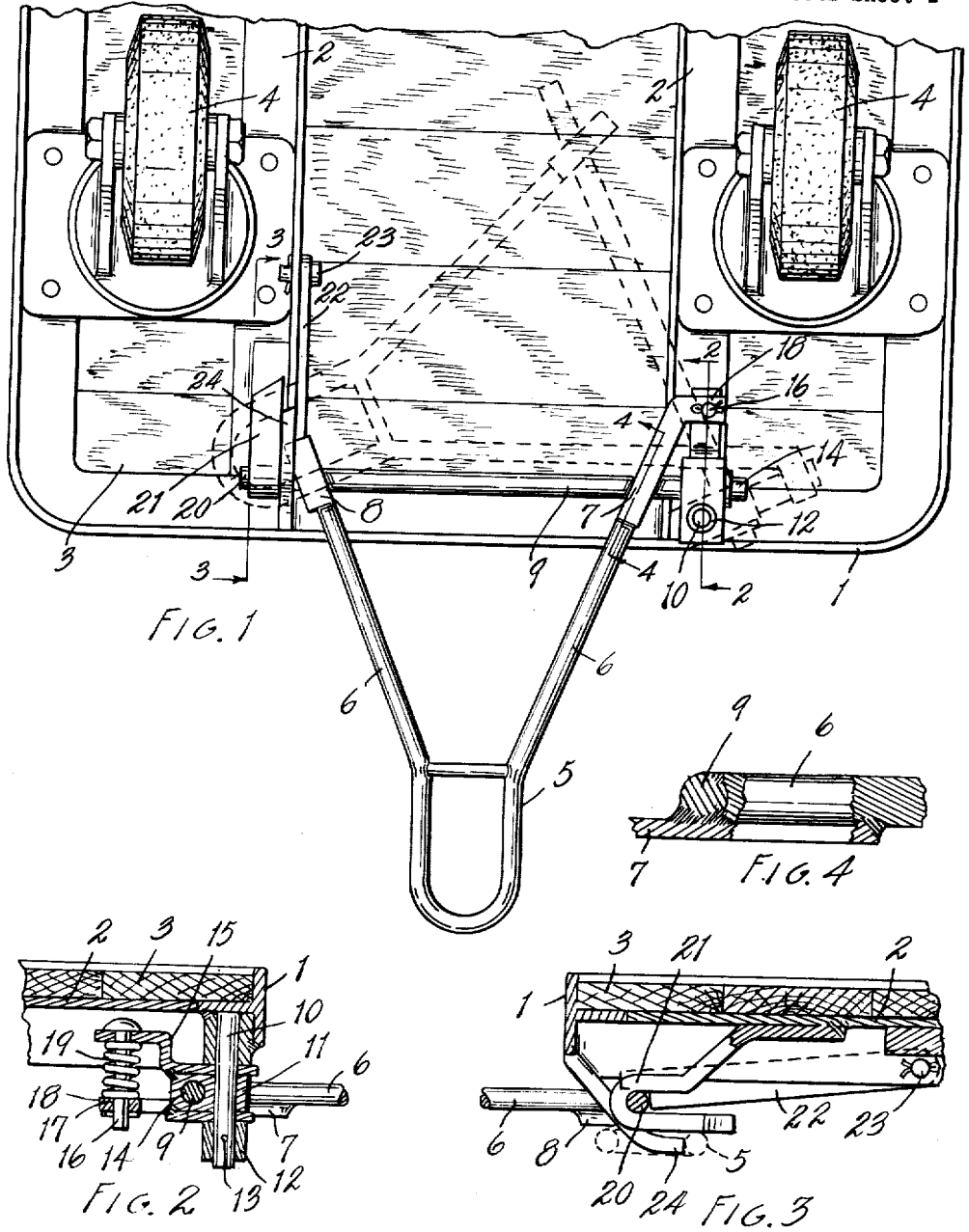
June 27, 1950 E. G. ULRICH 2,513,258
TRUCK COUPLING
Filed April 22, 1946 2 Sheets-Sheet 1
INVENTOR.
EMERY G. ULRICH
BY
ATTORNEY.

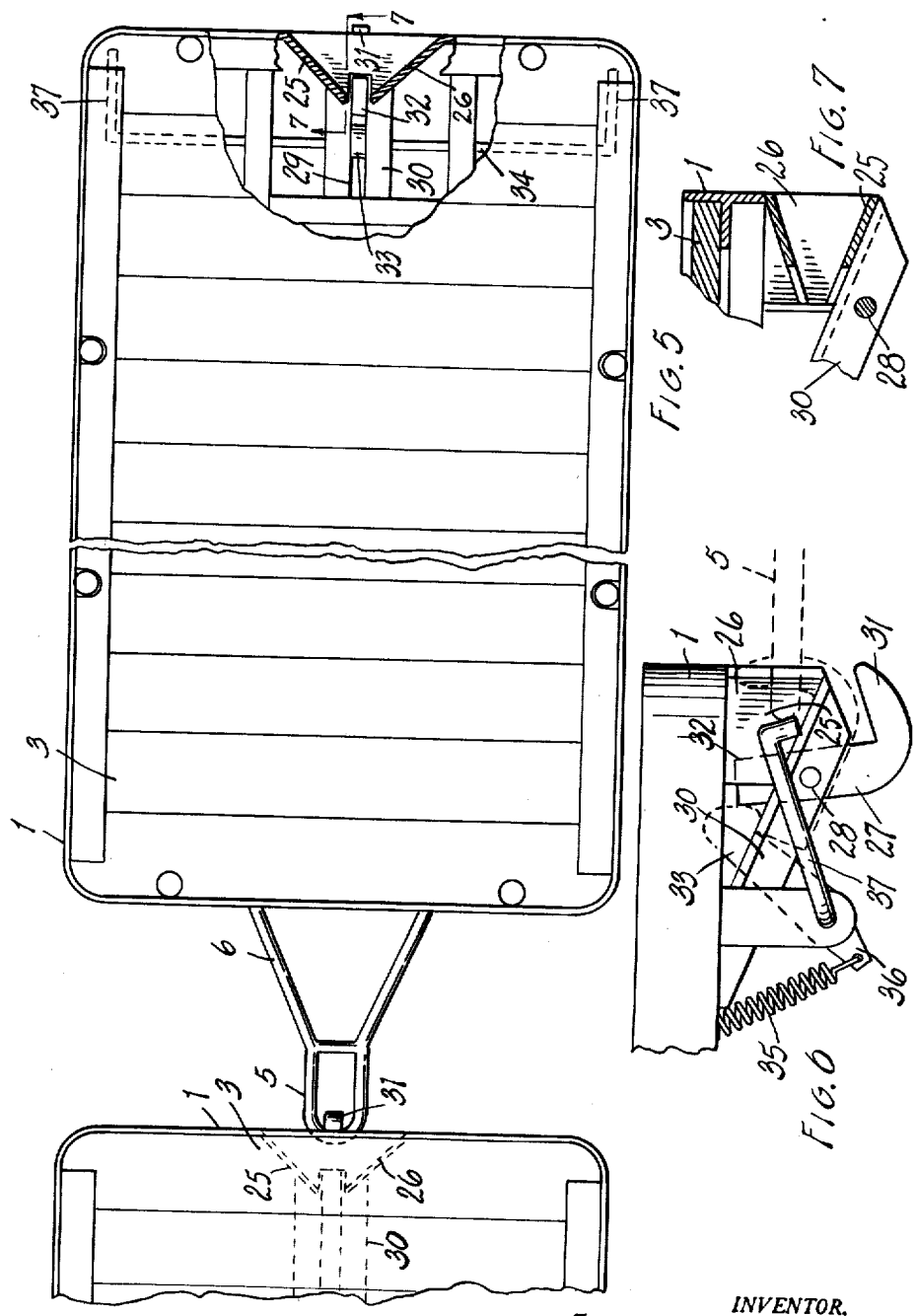

2,513,258

UNITED STATES PATENT OFFICE 2,513,258

TRUCK COUPLING

Emery G. Ulrich, Toledo, Ohio; Vivian R. Ulrich, administratrix of said Emery G. Ulrich, deceased, assignor to Vivian R. Ulrich Application April 22, 1946, Serial No. 664,021

13 Claims. (Cl. 280—33.44)

This invention relates to improvements in truck couplings.

The main objects of this invention are:

First, to provide a freight and warehouse truck, adapted also to be used in freight cars for the shipment of merchandise without unloading the truck, with a coupling means which may be collapsed beneath the body or extended to operative position at the end of the body.

Second, to provide a structure having these advantages in which the coupling member is yieldingly supported in an elevated position in both its extended and its collapsed positions.

Third, to provide a structure having these advantages which is economical in its parts and easy to manipulate.

Objects pertaining to details and economies of the invention will appear from the description to follow. The invention is defined in the claims.

A structure which embodies the features of the invention is illustrated in the accompanying drawing, in which:

Fig. 1 is an inverted view of a truck embodying my invention, the coupling member being shown in erected or extended position by full lines and in collapsed position by dotted lines.

Fig. 2 is a fragmentary view partially in vertical longitudinal section on line 2—2 of Fig. 1.

Fig. 3 is a fragmentary view in section on line 3—3 of Fig. 1.

Fig. 4 is a detail section on line 4—4 of Fig. 1.

Fig. 5 is a fragmentary plan view illustrating a pair of similar trucks embodying my invention in coupled relation, parts being broken away to show structural details of a coacting coupling member.

Fig. 6 is an enlarged fragmentary side elevation, the coupling jaw being shown in an open position by full lines and in closed position by dotted lines.

Fig. 7 is an enlarged fragmentary view on a line corresponding to line 7—7 of Fig. 5.

In the accompanying drawing, I have illustrated my invention as embodied in a truck adapted for use as a warehouse, freight or factory truck. The structure comprises a frame designated generally by the numeral 1 and having longitudinal intermediate frame members 2. The top or deck 3 is mounted on this frame, the securing means for the parts not being illustrated. Only the caster wheels 4 are illustrated.

The draw bar or link coupling member 5 is in general shaped like a link and adapted to engage a coacting coupling member on a trailer or on a similar truck as shown in Fig. 5 where the trucks are coupled in a train. The coupling member comprises rearwardly diverging draw bars 6 having flattened terminal portions 7 and 8 welded to the cross bar 9, the ends of the cross bar projecting laterally beyond the draw bars. The frame is provided with a vertically disposed draw bolt 10 which is mounted on the frame to project downwardly therefrom. The coupling member draw head or support 11 is pivotally or swingably mounted on this draw bolt and retained thereby by the collar 12 pinned to the draw bolt at 13. The end 14 of the cross bar 9 is pivotally engaged with the support.

The support is provided with an upwardly offset arm 15 constituting a thrust member for the bolt or pin 16 which is inserted through the hole 17 in the laterally offset portion 18 of the draw bar 7. The spring 19 on the bolt provides a spring supporting bias for the coupling member, yieldingly supporting it in an elevated position both when it is extended and when it is collapsed. With this pivotal support for the coupling member it may be swung under the truck body as shown by dotted lines in Fig. 1. When the coupling member is swung to its extended or erected position the end 20 of the cross bar 9 engages the rearwardly facing hook-shaped draft abutment 21. The locking dog 22 pivoted at 23 on one of the longitudinal members of the frame drops behind the cross bar 9, holding it in engagement with the abutment. To collapse the coupling member this dog is disengaged and the coupling member is free to be swung to collapsed position. In collapsed position it engages behind the stop member 24, the spring 19 acting to hold the coupling member in engagement with this stop as well as to hold the coupling member yieldingly in an elevated position when it is extended or erected.

The vertical movement of the coupling member is desirable as it permits the engagement of the link or draw bar coupling member 5 with the coacting draw head or female coupling member designated generally by the numeral 25 on a similar truck, the trucks being equipped with the draw bar coupling described at one end and with the coacting couplings 25 at the other end. However, the coupling described is capable of being connected to other types of coupling heads or jaw couplings.

The coupling 25 comprises a socket 26 having converging top, bottom and side walls and is adapted to receive the looped end of the draw bar or link described. The hook-like jaw 27 is pivoted at 28 on the support, the jaw being located in the slot 29 of the support 30. The hook portion 31 of the jaw is adapted to swing into the eye of the draw bar 5 when the upwardly projecting arm 32 of the coupling jaw is engaged by the end of the coupling member 5.

The locking dog 33 has a rounded hook-like nose and is pivotally mounted on the rockshaft 34 to engage the arm 32 on the jaw 27, as shown by dotted lines in Fig. 6, the spring 35 being connected to the rearwardly projecting arm 36 of the dog 33 and to the frame to apply biasing stress on the dog, urging it towards engaging position. The rockshaft is provided with arms 37 at each end positioned to be engaged from either side of the truck, the arms being under the platform but arranged for easy access.

The inwardly tapered socket of the female coupling member permits engagement of the coupling when the trucks to be coupled are in varying angular relations. The vertical swinging movement of the draw bar coupling member permits its engagement with other types of couplings and at considerably different elevations. It also permits the vertical swinging movement which is desirable in passing up inclines and in the convenient manual manipulation of a truck by the draw bar where that is desired.

I have illustrated and described my invention in a highly practical embodiment thereof. I have not attempted to illustrate or describe various adaptations of the invention which I contemplate as it is believed this disclosure will enable those skilled in the art to embody or adapt the invention as may be desired.

Having thus described my invention, what I claim as new and desire to secure by Letters Patent is:

1. The combination with a truck body, of a coupling member comprising rearwardly diverging draw bars, a cross bar secured to the inner ends of said draw bars to project laterally beyond the same, a support for said coupling member mounted on the under side of said body on a vertical pivot, one end of said cross bar being pivotally mounted on said support, said support having an inwardly projecting arm, the adjacent draw bar having a lateral offset extending below said arm, a spring biased bolt on said laterally offset end of said draw bar in thrust engagement with said arm on said support, said support permitting the swinging of said coupling member to extended position or beneath said body, said spring acting to yieldingly support the coupling member in approximately horizontal position, an inwardly facing hook-like draft abutment with which the swinging end of the cross bar engages when the coupling member is in its extended position, a locking dog engaging said cross bar when it is in engagement with said draft abutment, and a stop depending below said draft abutment to engage said coupling member when it is in its collapsed position, said spring acting to yieldingly support said coupling member in engagement with said stop.

2. The combination with a truck body, of a coupling member comprising rearwardly diverging draw bars, a cross bar secured to the inner ends of said draw bars to project laterally beyond the same, a support for said coupling member mounted on the under side of said body on a vertical pivot, one end of said cross bar being pivotally mounted on said support, said support permitting the swinging of said coupling member to extended position or beneath said body, a spring acting to yieldingly support the coupling member in approximately horizontal position, an inwardly facing hook-like draft abutment with which the swinging end of the cross bar engages when the coupling member is in its extended position, a locking dog engaging said cross bar when it is in engagement with said draft abutment, and a stop depending below said draft abutment to engage said coupling member when it is in its collapsed position, said spring acting to yieldingly support said coupling member in engagement with said stop.

3. The combination with a truck body, of a coupling member comprising rearwardly diverging draw bars, a cross bar secured to the inner ends of said draw bars to project laterally beyond the same, a support for said coupling member mounted on the under side of said body on a vertical pivot, one end of said cross bar being pivotally mounted on said support, said support having an inwardly projecting arm, the adjacent draw bar having a lateral offset extending below said arm, a spring biased bolt on said laterally offset end of said draw bar in thrust engagement with said arm on said support, said support permitting the swinging of said coupling member to extended position or beneath said body, said spring acting to yieldingly support the coupling member in approximately horizontal position, and a draft abutment with which the swinging end of the cross bar engages when the coupling member is in its extended position.

4. The combination with a truck body, of a coupling member comprising rearwardly diverging draw bars, a cross bar secured to the inner ends of said draw bars to project laterally beyond the same, a support for said coupling member mounted on the under side of said body on a vertical pivot, one end of said cross bar being pivotally mounted on said support, said support permitting the swinging of said coupling member to extended position or beneath said body, a spring acting to yieldingly support the coupling member in approximately horizontal position, and a draft abutment with which the swinging end of the cross bar engages when the coupling member is in its extended position.

5. The combination with a truck body, of a coupling member provided with a cross bar at its inner end, a support for said coupling member mounted on the under side of said body on a vertical pivot, one end of said cross bar being pivotally mounted on said support, said support permitting the swinging of said coupling member to extended position or to collapsed position beneath said body, a spring acting to yieldingly support the coupling member in approximately horizontal position, a draft abutment with which the swinging end of the cross bar engages when the coupling member is in its extended position, means for retaining said coupling member in extended position, and means for retaining said coupling member in its collapsed position.

6. The combination with a truck body, of a coupling member provided with a cross bar at its inner end, a support for said coupling member mounted on the under side of said body on a vertical pivot, one end of said cross bar being pivotally mounted on said support, said support permitting the swinging of said coupling member to extended position or to collapsed position beneath said body, a spring acting to yieldingly support the coupling member in approximately horizontal position, and a draft abutment with which the swinging end of the cross bar engages when the coupling member is in its extended position.

7. The combination with a truck body, of a coupling member, a coupling member support swingable on a vertical axis, said support permitting the swinging of the coupling member to extended position to project at one end of the truck body or to collapsed position beneath the body, said coupling member being mounted on said support member on a horizontal axis, and a spring acting to yieldingly support the coupling member in an elevated position on its axis when in both its extended and collapsed position.

8. The combination with a truck body, of a coupling member swingably mounted on said body to be extended at the end thereof or to be swung to a collapsed position below the body, spring means for yieldably supporting said coupling member in an elevated position, means for retaining said coupling member in its extended position, and means for retaining said coupling member in its collapsed position including said spring means.

9. The combination with a truck body, of a coupling member mounted on said body to be extended at the end thereof or to be adjusted to a collapsed position below the body, spring means for yieldably supporting said coupling member in an elevated position, means for retaining said coupling member in its extended position, and means for retaining said coupling member in its collapsed position including said spring means.

10. The combination with a truck body, of a truck bar coupling member swingably mounted on said body to extend at the end thereof or to be retracted horizontally below the body and having a loop at its outer end provided with a curved end, spring means for yieldably supporting said draw bar coupling member in an elevated position, means for retaining said coupling member in its extended position, a coupling head comprising an inwardly tapered outwardly facing socket adapted to receive the end of a similar draw bar coupling member when presented thereto in various angular relations, a hook-like coupling jaw provided with a straight arm projecting at an angle from said jaw into and pivoted on said socket to be engaged by the loop end of said draw bar member to swing the jaw into engagement with the loop, a spring actuated locking dog coacting with the arm on said coupling jaw for holding the jaw in the engaged position, and a manual means for releasing said dog.

11. The combination with a truck body, of a draw bar coupling member having a loop at its outer end, a coupling head for coacting with a similar drawbar comprising an outwardly facing socket adapted to receive the end of said draw coupling member, a hook-like coupling jaw provided with an arm positioned to be engaged by the loop end of said draw bar member and pivoted on said socket to swing the jaw into engagement with the loop, a pivoted spring actuated locking dog having a hooked nose coacting with the arm on said coupling jaw for holding the jaw in engaged position, and a manual means for releasing said dog.

12. The combination with a truck body, of a draw bar coupling member swingably mounted on said body to extend at the end thereof or to be retracted horizontally below the body and having a loop at its outer end, spring means for yieldably supporting said draw bar coupling member in an elevated position, means for retaining said coupling member in its extended position, a coupling head at the opposite end of said truck adapted to cooperate with a similar draw bar on another truck comprising an inwardly tapered outwardly facing socket adapted to receive the end of said similar draw bar coupling member when presented thereto in various angular relations, a hook-like coupling jaw provided with a straight arm pivoted on said socket and projecting at an angle to said jaw and into said socket to be engaged by the loop end of said similar draw bar member to swing the jaw into engagement with the loop, a pivoted locking dog having a hook on the end thereof with a rounded outer end coacting with said jaw for holding the jaw in engaged position, a spring biasing said dog toward said arm on said jaw, and a manual means for releasing said dog.

13. The combination with a truck body, of a draw bar coupling member having a loop at its outer end, spring means for yieldably supporting said draw bar coupling member in an elevated position, a coupling head at the opposite end of said truck adapted to cooperate with a similar draw bar on another truck comprising an inwardly tapered outwardly facing socket adapted to receive the end of said similar draw bar coupling member when presented thereto in various angular relations, a hook-like coupling jaw provided with a straight arm pivoted on said socket and projecting at an angle to said jaw and into said socket to be engaged by the loop end of said similar draw bar member to swing the jaw into engagement with the loop, a pivoted locking dog having a hook on the end thereof coacting with said jaw for holding the jaw in engaged position, a spring biasing said dog toward said arm on said jaw, and a manual means for releasing said dog.

EMERY G. ULRICH.

REFERENCES CITED

The following references are of record in the file of this patent:

UNITED STATES PATENTS

| Number | Name | Date |
|---|---|---|
| 1,582,045 | Howe | Apr. 27, 1926 |
| 1,632,384 | Showers | June 14, 1927 |
| 1,848,956 | Koehler | Mar. 8, 1932 |